United States Patent
Grey

[11] 3,784,287
[45] Jan. 8, 1974

[54] PLASTIC TRIPLET OBJECTIVE LENS SYSTEM

[75] Inventor: David S. Grey, Waltham, Mass.

[73] Assignee: Berkey Photo, Inc., Clifton, N.J.

[22] Filed: Dec. 13, 1972

[21] Appl. No.: 314,724

[52] U.S. Cl............ 350/226, 350/175 NG, 350/206, 350/252
[51] Int. Cl................... G02b 1/04, G02b 9/16
[58] Field of Search.................................... 350/226

[56] References Cited
UNITED STATES PATENTS
3,438,697  4/1969  Melech .............................. 350/226
3,578,847  5/1971  Grey ................................... 350/226

*Primary Examiner*—John K. Corbin
*Attorney*—Sidney Neuman et al.

[57] ABSTRACT

A three element f/5.6 objective lens system is adapted for use with still picture cameras. All three elements of the system are preferably constructed of plastic materials.

6 Claims, 2 Drawing Figures

FIG. 2.

EQUIVALENT FOCAL LENGTH = 4.4 MM  F/5.6

| LENS ELEMENT | $N_D$ | RADII, MM | SPACING AND THICKNESS, MM | CLEAR APERTURE DIA., MM |
|---|---|---|---|---|
| I | 1.491 | $R_1$ +6.993 | | 10.922 |
| | | $R_2$ +42.55 | $T_1$ = 2.655 | 8.737 |
| | | | $S_1$ = 0.375 | |
| II | 1.567 | $R_3$ -95.25 | | 8.432 |
| | | $R_4$ +6.544 | $T_2$ = 0.968 | 8.686 |
| | | | $S_2$ = 1.665 | |
| III | 1.567 | $R_5$ +14.943 | $T_3$ = 1.800 | 7.620 |
| | | $R_6$ -71.654 | | 7.823 |
| | | | $S_3$ = 0.984 TO STOP | |

PLASTIC TRIPLET OBJECTIVE LENS SYSTEM

BACKGROUND OF THE INVENTION

This invention relates to an improved triplet objective lens system particularly adapted for use in connection with still picture cameras.

The present invention finds particular application in the low priced photographic cameras which are fabricated by means of high volume production techniques and employ simple and inexpensive objective lenses. It has been found that the cost of producing a triplet objective lens system can be materially reduced if the lens elements of the system can be constructed entirely of plastic materials. Such plastic materials not only have the advantage over glass of low cost but they also simplify the manufacture of the system.

A lens system constructed in accordance with the present invention permits the individual lens elements to be molded out of plastic and provides a system having a speed of f/5.6. The lens system, which is adapted for low cost fixed focus cameras, has good optical properties and may be easily and inexpensively manufactured.

SUMMARY OF THE INVENTION

In accordance with one aspect of the invention, a triplet objective lens system is provided consisting of two outer positive lens elements and an intermediate negative lens element. The first of the two outer positive lens elements is a frontal positive meniscus lens, and the other of the positive lenses is a rearward condensing lens element. The lens system possesses the features, properties and relationships of the elements which will be exemplified in the detailed disclosure to follow. This system is so designed that each of the three lens elements may be constructed of plastic materials, particularly acrylics. The indices of refractions permit the frontal lens to be formed of methyl methacrylate and for the other two lenses to be formed of polyacrylonitrile.

BRIEF DESCRIPTION OF THE DRAWINGS

FIG. 2 is a tabular compilation of numerical constructional data for the preferred embodiment of the invention.

DETAILED DESCRIPTION OF THE PREFERRED EMBODIMENT

Figure 1:
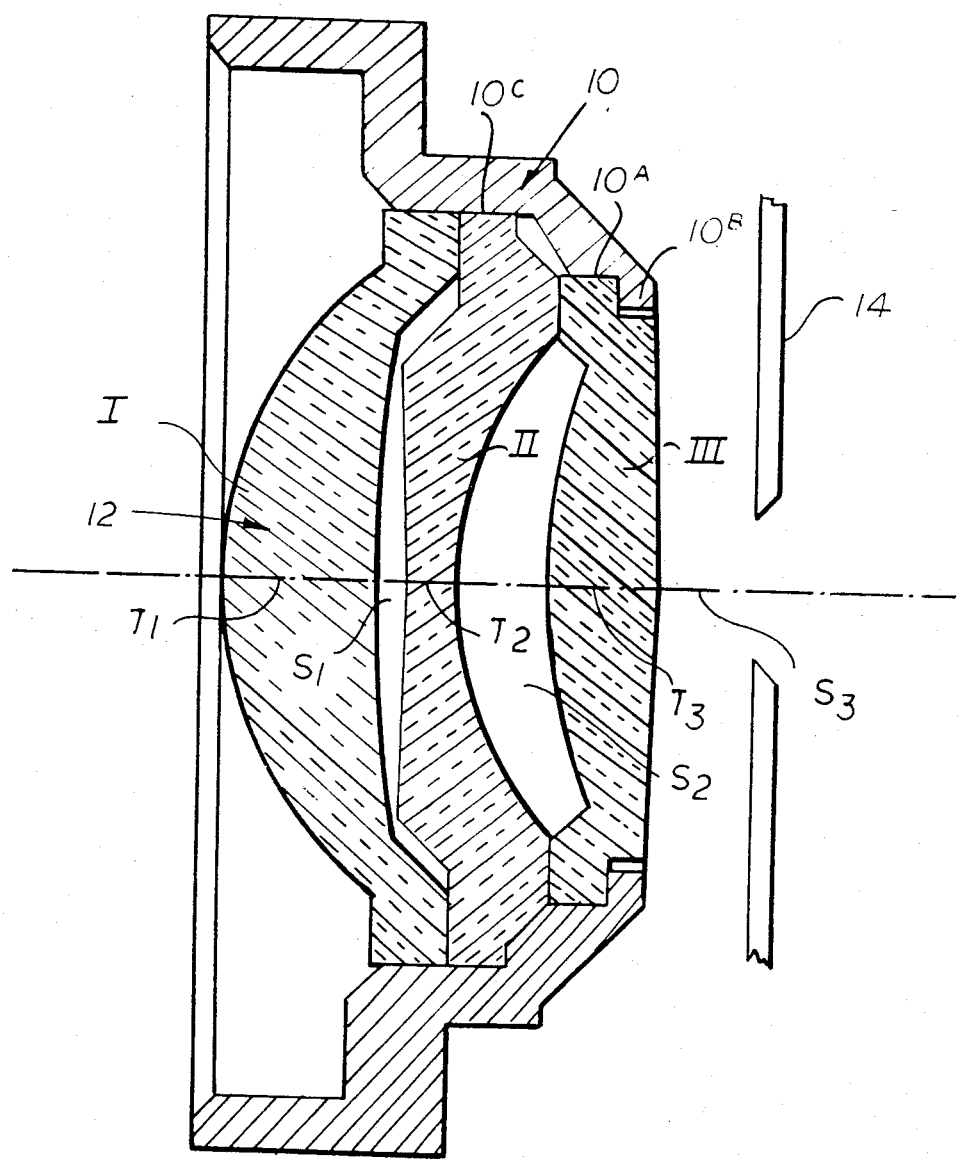
FIG. 1 is an axial cross sectional view of a mounted triplet objective lens system constructed in accordance with this invention.

In FIG. 1, a lens mount 10 is illustrated for supporting the three lens elements I, II and III of the triplet objective lens system 12, in appropriately spaced, axial alignment. This particular lens mount is shown for illustration purposes only, and this is but one type of mount which may be used with the lens system disclosed. Since the lens system is primarily intended for use in connection with relatively low priced photographic cameras which are fabricated on a high volume production basis, it is preferred that the lens mount also be constructed so that its manufacture and the assembly of the component lens elements therein are both adapted to mass production techniques.

In this particular embodiment, the lens element III is mounted in a cylindrical recess 10A at the rear of the lens mount 10, and the peripheral edge of this lens engages a forwardly facing shoulder 10B. The other lens elements I and II are mounted in front of lens element III on a second cylindrical interior surface 10c, and they may there be held in place by suitable securing means such as a threaded rim or the like (not shown). The lens elements are preferably so constructed that their nonoptical peripheral edge portions are in contact with one another, thus providing the desired accuracy in the spacing between the central optical portions of the lens elements and eliminating the requirement for special spacing devices within the lens mount 10. Spaced rearwardly of the lens mount 10 is a suitable stop or diaphragm 14, the position of which is also set forth in Table I.

The three lens elements I, II and III of the triplet objective lens system 12 are spaced, simple lenses. Lens element I is a frontal, positive, biconvex meniscus lens; lens element II is a negative concave dispersing lens; and lens element III is a positive biconvex, rearward condensing lens.

Constructional values for the preferred embodiment of the invention are as shown in FIG. 2 and repeated in Table I below, in which the lens elements are numbered from front to rear. N is the index of refraction for the D line of the spectrum, R is the radius of curvature of the lens surface, T is the axial thickness of the lens element, and S is the axial air spacing between the lens elements. The subscripts denote surfaces, elements and air spaces numbered consecutively from front to rear, and the + and − signs in the third column correspond to surfaces which are respectively convex and concave to the front.

TABLE I

Equivalent Focal Length = 44 mm. f/5.6

| Lens Element | $N_d$ | Radii, mm. | Spacing and Thicknesses, mm. | Clear Apperture Dia. mm. |
|---|---|---|---|---|
| I | 1.491 | $R_1$+6,993 | | 10.922 |
| | | | $T_1$=2.655 | |
| | | $R_2$+42.55 | | 8.737 |
| | | | $S_1$=0.375 | |
| II | 1.567 | $R_3$−95.25 | | 8.432 |
| | | | $T_2$=0.968 | |
| | | $R_4$+6.544 | | 8.686 |
| | | | $S_2$=1.665 | |
| III | 1.567 | $R_5$+14.943 | | 7.620 |
| | | | $T_3$=1.800 | |
| | | $R_6$−71.654 | | 7.823 |
| | | | $S_3$=0.984 to Stop | |

The data given are for an objective lens system having an equivalent focal length of 44 mm. To make a triplet objective lens system having a different focal length it is only necessary to scale all dimensions in the same proportion.

An objective constructed in accordance with the foregoing data has a maximum relative aperture of f/5.6 and a back focal length of 35.37 mm. With this objective the stop or diaphragm diameter may be on the order of 6.274 mm., and the position of the stop or diaphragm 14 may be 35.2 mm. from the film plane with the lens system focused at infinity.

Of particular importance is the fact that with the specified indices of refraction Nd, all lens elements of the objective lens system may be constructed of plastic materials such as acrylic materials. For example, lens element I may be formed of methyl methacrylate and lens elements II and III may be formed of polyacrylonitrile. These materials provide adequate optical quality and they permit the system to be readily fabricated at lower cost and with high volume production techniques. All of the lens elements may be molded from these plastic materials.

The invention has been described in detail with particular reference to the preferred embodiment thereof, and it is intended that this description be interpreted as being exemplary and illustrative and not in limiting sense.

It is to be understood that the present disclosure has been made only by way of example and that many additional modifications and changes in various details may be resorted to without departing from the invention.

What is claimed is:

1. A triplet objective lens system consisting of two outer positive lens elements and an intermediate negative lens element, said lens elements having substantially the following characteristics and space relationships as related to a focal length of 44 millimeters, each numbered from front to rear, and wherein $N_d$ is the index of refraction, R is the radius of curvature of the lens surface, T is the axial thickness of the lens element, and S is the axial air spacing between the lens elements:

| Lens Element | $N_d$ | Radii mm. | Spacing and Thicknesses, mm. |
|---|---|---|---|
| I | 1.491 | $R_1$+6,993 | |
| | | | $T_1$=2.655 |
| | | $R_2$+42.55 | |
| | | | $S_1$=0.375 |
| II | 1.567 | $R_3$−95.25 | |
| | | | $T_2$=0.968 |
| | | $R_4$+6.544 | |
| | | | $S_2$=1.665 |
| III | 1.567 | $R_5$+14.943 | |
| | | | $T_3$=1.800 |
| | | $R_6$−71.654 | |

2. The triplet objective lens system of claim 1 wherein diameters of the clear apertures for each of the lens surfaces are as follows:

| Lens Surface | Clear Aperture in mm. |
|---|---|
| $R_1$ | 10.922 |
| $R_2$ | 8.737 |
| $R_3$ | 8.432 |
| $R_4$ | 8.686 |
| $R_5$ | 7.620 |
| $R_6$ | 7.823 |

3. The triplet objective lens system of claim 1 wherein said lens elements are constructed of acrylics.

4. The triplet objective lens system of claim 3 wherein lens elements II and III are constructed of polyacrylonitrile.

5. The triplet objective lens system of claim 4 wherein lens element I is constructed of methyl methacrylate.

6. The triplet objective lens system of claim 1 wherein a diaphragm is provided and is spaced 0.984 mm. rearwardly of the rearward condensing lens element (III).

* * * * *

UNITED STATES PATENT OFFICE
CERTIFICATE OF CORRECTION

Patent No. 3,784,287     Dated   January 8, 1974

Inventor(s)  DAVID S. GREY

It is certified that error appears in the above-identified patent and that said Letters Patent are hereby corrected as shown below:

Column 2, line 37 "apperture" should be
          -- aperture --

Column 2, line 39 and Claim 1 - "$R_1 + 6,993$"
          should be -- $R_1 + 6.993^1$ --

Column 2, line 45 - "$T_3 + 1.800$" should appear
          in 4th column of Table I Signed and sealed this 19th day of November 1974.

(SEAL)
Attest:

McCOY M. GIBSON JR.           C. MARSHALL DANN
Attesting Officer             Commissioner of Patents